United States Patent [19]
Matsunaga et al.

[11] Patent Number: 6,127,497
[45] Date of Patent: Oct. 3, 2000

[54] ELEVATED PRESSURE POLYMERIZATION PROCESSES WITH LATE TRANSITION METAL CATALYST SYSTEMS

[75] Inventors: Phillip T. Matsunaga, Houston; Jo Ann Marie Canich, Webster; George Alan Vaughan, Houston, all of Tex.; David Edward Gindelberger, Bedminster, N.J.; Rinaldo Soria Schiffino; Kevin Richard Squire, both of Kingwood, Tex.; Rolf Bodo Temme, Dormagen, Germany

[73] Assignee: Exxon Chemical Patents Inc., Houston, Tex.

[21] Appl. No.: 08/877,213

[22] Filed: Jun. 17, 1997

Related U.S. Application Data

[60] Provisional application No. 60/020,095, Jun. 17, 1996, and provisional application No. 60/020,199, Jun. 21, 1996.

[51] Int. Cl.$^7$ .................................................. C08F 4/06
[52] U.S. Cl. ........................... 526/141; 526/139; 526/140; 526/160; 526/161; 526/172; 502/123; 502/155
[58] Field of Search .................... 526/160, 161, 526/172, 141, 139, 140; 502/123, 155

[56] References Cited

U.S. PATENT DOCUMENTS

| | | |
|---|---|---|
| 3,686,159 | 8/1972 | Bauer et al. . |
| 3,759,889 | 9/1973 | Bauer et al. . |
| 4,716,205 | 12/1987 | Klabunde ................................ 526/161 |
| 5,030,606 | 7/1991 | Klabunde ................................ 502/117 |
| 5,084,534 | 1/1992 | Welborn et al. ........................ 526/160 |
| 5,324,799 | 6/1994 | Yano et al. . |
| 5,369,196 | 11/1994 | Matsumoto et al. . |
| 5,408,017 | 4/1995 | Turner et al. . |
| 5,502,128 | 3/1996 | Flores et al. ........................... 526/126 |
| 5,714,556 | 2/1998 | Johnson et al. ......................... 526/147 |

FOREIGN PATENT DOCUMENTS

| | | |
|---|---|---|
| 0 114 434 | 8/1984 | European Pat. Off. . |
| 0 454 231 A2 | 10/1991 | European Pat. Off. . |
| A1 0 612 768 | 8/1994 | European Pat. Off. . |
| 0 768 319 | 4/1997 | European Pat. Off. . |
| WO 93/05732 | 4/1993 | WIPO . |
| WO 93/25590 | 12/1993 | WIPO . |
| WO 94/01471 A1 | 1/1994 | WIPO . |
| WO 96/23010 | 8/1996 | WIPO . |
| WO96/23010 | 8/1996 | WIPO . |
| WO 97/02298 | 1/1997 | WIPO . |

OTHER PUBLICATIONS

Johnson et al, J. Am. Chem. Soc. 1995, 6414–6415.
"Simultaneous Oligomerizatoin and Polymerization of Ethylene", Denger, C., et al, Makromolekulare Chemie, Rapid Communications, vol. 12, N. 12, (1991) pp. 697–701.
Database WPI Section Ch, Week 913, Derwent Publications Ltd., London, GB; Class A17, AN 94–107675 & SU 1 455 650 A (Krentsel B A), 15 (1993).
"Polymerization of Olefins with Noble Metal (Ru, Rh, PD) Compounds Activated By Alkylaluminium or Alkyltitanium Compounds", Kazuo Soga, et al, Makromolekulare Chemie, Rapid Communications, vol. 11, No. 6, (1990) pp. 285–291.
"New Pd(II)–and Ni(II)–Based Catalysts for Polymerization of Ethylene and α–Olefins," Johnson, et al, J. Am. Chem. Soc., pp. 6414–6415 (1995).
"New Pd(II)–and Ni(II)–Based Catalysts for Polymerization of Ethylene and α–Olefins," Johnson, et al, Dept. of Chemistry, University of North Carolina at Chapel Hill, NC—Presentation—date (unk).

*Primary Examiner*—David W. Wu
*Assistant Examiner*—Ling-Siu Choi
*Attorney, Agent, or Firm*—W. G. Muller

[57] ABSTRACT

The invention encompasses late transition metal catalyst systems and their use in polymerization processes, particularly in solution, 2-phase suspension and super-critical phase polymerization of ethylene-containing polymers. Preferred embodiments include the use of a late transition metal catalyst system comprising a Group 8, 9, 10, or 11 metal complex stabilized by a bidentate ligand structure for polymerization under elevated ethylene pressure, or concentration, conditions.

12 Claims, No Drawings

ELEVATED PRESSURE POLYMERIZATION PROCESSES WITH LATE TRANSITION METAL CATALYST SYSTEMS

This application is based on U.S. provisional applications 60/020,095, filed Jun. 17, 1996, and 60/020,199, filed Jun. 21, 1996.

FIELD OF THE INVENTION

This invention relates to polymerization of olefins using late transition metal catalyst systems.

BACKGROUND OF THE INVENTION

Early transition metal catalysts for olefin polymers by coordination polymerization are well-known, typically those are the traditional Ziegler-type catalysts based on Group 4 and 5 of the Periodic Table (IUPAC new nomenclature) and the newer metallocene catalysts based on Group 4–6 metals. However, specific late transition metal catalysts suitable for olefin polymerization had not offered the same levels of activity or molecular weight capability for olefin polymerization during the development of these catalyst systems and additional work was published addressing this lack.

In Johnson, Killian, and Brookhart, *J. Am. Chem. Soc.*, 1995, 117, 6414 the reporters describe the use of Ni and Pd complexes for the solution homopolymerization of ethylene, propylene, and 1-hexene. The catalyst precursors are square-planar, $M^{2+}$, $d^8$, 16 electron complexes incorporating substituted, bidentate diimine ligands. The active coordination sites are occupied by either methyl or bromide ligands. Methyl ligand complexes were activated with $H^+(OEt_2)_2[B(3,5-(CF_3)_2C_6H_3)_4]^-$ and bromide ligand complexes were activated with methylalumoxane (MAO) or diethylaluminumchloride as cocatalysts. All examples are solution process examples, the illustrated process temperatures do not exceed 25° C. Examples 6 and 7 illustrate a significant increase in branching and significant decreases in $M_n$ and $T_m$ (by differential scanning calorimetry) when the illustrated solution process temperature is raised from 0° C. to 25° C.

Homogeneous processes such as high temperature solution and high pressure, high temperature polymerization processes, such as those at 500 bar and above, have shown particular suitability with metallocene systems. These processes allow for the improved productivity that occurs with greater reactivities at high temperature, the high pressure maintaining an essentially single phase reaction medium while permitting the higher temperatures. See, U.S. Pat. No. 5,408,017 and its equivalent WO-A-93/05732, and EP-A1-0 612 768. In this last document, bridged and unbridged hafnium metallocene compounds stabilized by non-coordinating anions after activation with alkyl-aluminum are utilized in processes at temperatures exceeding 120° C. These solution processes are preferably to be conducted at pressures of 500 to 3500 kg/cm².

In view of the process advantages associated with high temperature processes, it is industrially desirable to identify conditions under which late transition metal olefin polymerization catalysts can be effectively utilized.

SUMMARY OF INVENTION

The invention comprises a process for the polymerization of ethylene polymers comprising contacting ethylene and optionally, one or more of $C_3$–$C_{20}$ α-olefins, $C_4$–$C_{20}$ diolefins, ethylenically unsaturated polar monomers, and other suitable monomers, with an unsupported late transition metal catalyst system at elevated ethylene pressures, preferably at least 60 psia (413.7 kPa). Typically the contacting can be practiced in a solvent or suspension process in a solvent or diluent wherein the temperature is at least 30° C. Additionally the process of the invention can be practiced with or without diluent or solvent in an elevated pressure process wherein said contacting is done at a temperature of at least 120° C. and a pressure of at least 50 bar (5000 kPa).

DETAILED DESCRIPTION OF THE INVENTION

The polymerization catalysts of this invention can be derived from the late transition metal compounds of formula:

$$LMX_r$$

wherein M is a Group 8, 9, 10, or 11 metal, preferably a first row metal, also preferably a $d^6$, $d^8$ or $d^{10}$ metal, most preferably $d^8$; L is a bidentate ligand that stabilizes a square planar geometry and charge balances the oxidation state of $MX_r$; each X is, independently, a hydride radical, a hydrocarbyl radical, a substituted hydrocarbyl radical, a halocarbyl radical, a substituted halocarbyl radical, and hydrocarbyl- and halocarbyl-substituted organometalloid radicals; or two X's are joined and bound to the metal atom to form a metallacycle ring containing from about 2 to about 20 carbon atoms; or one or more X can be a neutral hydrocarbyl containing donor ligand, e.g., an olefin, diolefin, or aryne ligand; and r=0, 1, 2, or 3. When Lewis-acid activators, such as methylalumoxane, aluminum alkyls, or alkylaluminum halides, which are capable of donating an X ligand, as described above, to the transition metal component, are used, or when the ionic activator is capable of extracting X, one or more X may additionally be independently selected from the group consisting of a halogen, alkoxide, aryloxide, amide, phosphide or other univalent anionic ligand; two such X's joined to form an anionic chelating ligand; or, one or more neutral non-hydrocarbyl atom containing donor ligand, e.g., phosphine, amine, nitrile or CO ligand.

In a preferred embodiment of the invention, the bidentate ligand, L, is defined by the following formula:

wherein A is a bridging group containing a Group 13–15 element; each E is independently a Group 15 or 16 element bonded to M; each R is independently a $C_1$–$C_{30}$ containing radical or diradical group which is a hydrocarbyl, substituted-hydrocarbyl, halocarbyl, substituted-halocarbyl, hydrocarbyl-substituted organometalloid, halocarbyl-substituted organometalloid, m and n are independently 1 or 2 depending on the valency of E; and p is the charge on the bidentate ligand such that the oxidation state of $MX_r$ is satisfied.

In the most preferred embodiment of the invention, the bridging group, A, is defined by the following formulae:

A-1

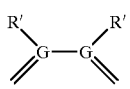

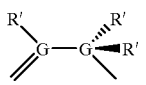
A-2

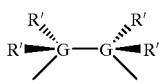
A-3

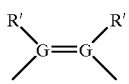
A-4

A-5

A-6

A-7

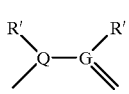
A-8

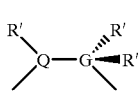
A-9

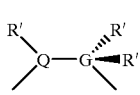
A-10

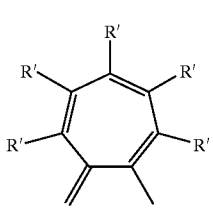
A-11

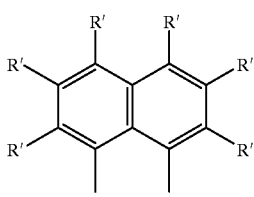
A-12

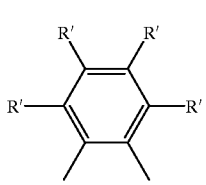
A-13

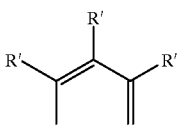
A-14 wherein G is a Group 14 element especially C, Si, and Ge; Q is a Group 13 element especially B and Al;, and R' are independently hydride radicals, $C_1$–$C_{30}$ hydrocarbyl radicals, substituted hydrocarbyl radicals, halocarbyl radicals, substituted halocarbyl radicals, and hydrocarbyl- and halocarbyl-substituted organometalloid radicals, and optionally two or more adjacent R' may form one or more $C_4$ to $C_{40}$ rings to give a saturated or unsaturated cyclic or polycyclic ring.

Also in the most preferred embodiment of the invention, each R is independently a bulky $C_1$–$C_{30}$ containing radical group which is a hydrocarbyl, substituted-hydrocarbyl, halocarbyl, substituted-halocarbyl, substituted organometalloid, hydrocarbyl-substituted organometalloid, or halocarbyl-substituted organometalloid. Bulky radical groups include phenyls, substituted phenyls, alkyls and substituted alkyls bonded to E through a tertiary carbon atom, alicyclic and polyalicyclic containing hydrocarbyls, particularly those bonded to E through a tertiary carbon and the like.

In the definitions above, the term "substituted" is as defined or refers to $C_1$–$C_{30}$ containing radicals which are to be essentially hydrocarbyl, but may include one or more non-hydrocarbyl atoms (such as Si, Ge, O, S, N, P, halogen, etc.) in place of one or more carbon atoms.

In the very most preferred embodiment of this invention, M is a group 10 metal, E is a group 15 element especially nitrogen with m and n being one and p being zero, the bridge is as drawn in A-1, and R is a substituted phenyl group preferably substituted in at least the 2 and 6 positions with non-hydride R' groups. For high molecular weight polymers, R' is preferably $C_3$–$C_{30}$, preferably with a secondary or tertiary carbon atom bonded to the phenyl group. For lower molecular weight polymers, R in the 2 and 6 positions are preferably a $C_1$–$C_2$ hydrocarbyl group or a $C_3$–$C_{10}$ hydrocarbyl group with a primary carbon atom bonded to the phenyl group.

For the purposes of this patent specification, the terms "cocatalysts or activators" are used interchangeably and are defined to be any compound or component which can activate the late transition metal compound.

The late transition metal catalyst compounds according to the invention may be activated for polymerization catalysis in any manner sufficient to allow coordination polymerization. This can be achieved, for example, when one X ligand can be abstracted and the other X will either allow insertion of the unsaturated monomers or will be similarly abstractable for replacement with an X that allows insertion of the unsaturated monomer. Traditional organometallic compound Ziegler cocatalysts may be utilized. Additionally, the traditional activators of metallocene polymerization art are suitable activators; those typically include Lewis acids such as alumoxane compounds, and ionizing, anion precursor compounds that abstract one X so as to ionize the transition metal center into a cation and provide a counterbalancing, compatible, noncoordinating anion.

In general, the late transition metal compound may be activated with an alumoxane, Ziegler cocatalyst, "noncoordinating anion" precursor compounds and halide salts of the Group 13–16 metals each of which is described more fully below.

The Ziegler cocatalyst will typically be an organometallic compound of a metal of Groups 1, 2, 12 or 13 of the Periodic table of elements. Preferred are organoaluminum compounds selected from the group consisting of aluminum alkyl, aluminum alkyl halide and aluminum halide. These can be represented by the formulae:

| | |
|---|---|
| $Al(R^1)_s X'_{3-s}$, 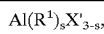 | wherein $R^1$ is independently a hydride or $C_1$ to $C_{10}$ hydrocarbyl radical including aliphatic, alicyclic or aromatic hydrocarbon radicals, X' is a halogen and s is an integer from 0 to 3; and, |
| $Al_2 R^1{}_3 X'_3$  | which are hydrocarbylaluminum sesquihalides. |

Examples include triethylaluminum, triisobutylaluminum, diethyl aluminumchloride, $Al_2Et_3Cl_3$ and $Al_2(i\text{-}Bu)_3Cl_3$.

When the activator is a Ziegler cocatalyst, the preferred molar ratio of late transition metal compound to Ziegler cocatalyst (typically measured as moles of aluminum) is from 1:1000 to 1:1, more preferably from 1:200 to 1:1 and most preferably from 1:100 to 1:1, although both higher and lower ratios may also be used.

Alkylalumoxanes and modified alkylalumoxanes are suitable as catalyst activators. The alumoxane component useful as catalyst activator typically is an oligomeric aluminum compound represented by the general formula $(R^2\text{---}Al\text{---}O)_n$, which is a cyclic compound, or $R^2(R^2\text{---}Al\text{---}O)_n AlR^2{}_2$, which is a linear compound. In the general alumoxane formula $R^2$ is independently a $C_1$ to $C_{10}$ hydrocarbyl radical, for example, methyl, ethyl, propyl, butyl or pentyl and "n" is an integer from 1 to about 100. Most preferably, $R^2$ is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952,540, 5,041,584, 5,091, 352, 5,206,199, 5,204,419, 4,874,734, 4,924,018, 4,908,463, 4,968,827, 5,329,032, 5,248,801, 5,235,081, 5,157,137, 5,103,031 and EP 0 561 476 Al, EP 0 279 586 131, EP 0 516 476 A, EP 0 594 218 Al and WO 94/10180, each being incorporated by reference for purposes of U.S. patent practice.

When the activator is an alumoxane, a preferred transition metal compound to activator molar ratio from 1:10000 to 1:1, more preferably from about 1:5000 to 1:1, even more preferably from about 1:1000 to 1:1, and most preferably from about 1:500 to 1:1. Higher or lower ratios may also be used.

In general, the late transition metal compound may be activated with an alumoxane, Ziegler cocatalyst, "noncoordinating anion" precursor compounds and halide salts of the Group 13–16 metals each of which is described more fully below.

The term "noncoordinating anion" as used for the ionizing, anion precursor compounds ("noncoordinating anion precursors") is recognized to mean an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex between the late-transition-metal catalyst compounds and the ionizing, anion pre-cursor compounds decomposes. Further, the anion will not transfer an anionic substituent or fragment to the cation so as to cause it to form a neutral four coordinate metal compound and a neutral by-product from the anion. Noncoordinating anions useful in accordance with this invention are those which are compatible, stabilize the late-transition-metal cation in the sense of balancing its ionic charge, yet retain sufficient lability to permit displacement by an olefinically unsaturated monomer during polymerization. Additionally, the anions useful in this invention will be of sufficient molecular size to partially inhibit or help to prevent neutralization of the late-transition-metal cation by Lewis bases other than the polymerizable monomers that may be present in the polymerization process.

Descriptions of ionic catalysts, those comprising a transition metal cation and a non-coordinating anion, suitable for coordination polymerization appear in the early work in U.S. Pat. Nos. 5,064,802, 5,132,380, 5,198,401, 5,278,119, 5,321,106, 5,347,024, 5,408,017, WO 92/00333 and WO 93/14132. These teach a preferred method of preparation wherein metallocenes are protonated by an anion precursor such that an alkyl/hydride group is abstracted from a transition metal to make it both cationic and charge-balanced by the non-coordinating anion. These teachings are as to anion-providing precursors are suitable for the late transition metal catalysts of the present invention.

The use of ionizing ionic compounds not containing an active proton but capable of producing both the active metal cation and a noncoordinating anion is also known. See, EP-A-0 426 637, EP-A-0 573 403 and U.S. Pat. No. 5,387, 568. Reactive cations other than the Bronsted acids include ferrocenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a non-coordinating anion as described above. The hydrated salts can be prepared by reaction of the metal cation-non-coordinating anion salt with water, for example, by hydrolysis of the commercially available or readily synthesized $LiB(Pfp)_4$ which yields $[Li.xH_2O][B(pfp)_4]$, where (pfp) is pentafluorophenyl or perfluorophenyl. Again, these activator compounds will be suitable for the catalyst systems of this invention.

Any metal or metalloid capable of forming a coordination complex, which preferably is resistant to degradation by water (or other Bronsted or Lewis Acids), may be used or contained in the anion. Suitable metals include, but are not limited to, aluminum, gold, platinum and the like. Suitable metalloids include, but are not limited to, boron, phosphorus, silicon and the like. The description of non-coordinating anions and precursors thereto of the documents of the foregoing paragraphs are incorporated by reference for purposes of U.S. patent practice.

An additional method of making the ionic catalysts uses noncoordinating anion precursors which are initially neutral Lewis acids but form the cation and anion upon ionizing reaction with the late transition metal compounds, for example tris(pentafluorophenyl) boron acts to abstract a hydrocarbyl, hydride or silyl ligand to yield a late-transition-metal cation and stabilizing non-coordinating anion; see EP-A-0 427 697 and EP-A-0 520 732 which are directed to metallocene catalyst systems. Ionic catalysts for coordination polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

When the cation portion of an ionic non-coordinating precursor is a Bronsted acid such as protons or protonated Lewis bases, or a reducible Lewis acid such as ferricenium or silver cations, or alkali metal or alkaline earth metal cations such as those of sodium, magnesium or lithium cations, the transition metal to activator molar ratio may be any ratio, but preferably from about 10:1 to 1:10; more preferably from about 5:1 to 1:5; even more preferably from about 2:1 to 1:2; and most preferably from about 1.2:1 to 1:1.2 with the ratio of about 1:1 being the most preferred. Similar ratios may be used for other noncoordinating anion precusor compounds.

The late transition metal catalyst compounds of this invention may also be activated with ionizing anion precursors including the halide salts of Group 13–16 metals or metalloids, preferably the fluoride and oxyfluoride salts, e.g., those capable of providing the following anions: $BF_4^-$, $PF_6^-$, $SbF_6^-$, $TeOF_6^-$ and $AsF_6^-$.

When halide salts of Group 13–16 metals or metalloids are used as the activator, the preferred total transition metal compound to activator molar ratio is preferably from 10:1 to 1:10, more preferably from about 5:1 to 1:5, even more preferably from 2:1 to 1:2, and even more preferably from 1.2:1 to 1:1.2 with 1:1 being most preferred. Higher or lower ratios may also be used.

When using ionic catalysts of the late transition metal complexes comprising cations and non-coordinating anions, the total catalyst system can additionally comprise one or more scavenging compounds. The term "scavenging compounds" is meant to include those compounds effective for removing polar impurities from the reaction environment. Impurities can be inadvertently introduced with any of the polymerization reaction components, particularly with solvent, monomer and catalyst feed, and adversely affect catalyst activity and stability. Impurities can result in decreased, variable or even elimination of catalytic activity. The polar impurities, or catalyst poisons include water, oxygen, metal impurities, etc. While the late transition metal catalysts of the present invention can be less sensitive to impurities than metallocene catalyst systems, reduction or elimination of poisons remains a viable option. Preferably steps are taken before provision of such into the reaction vessel, for example by chemical treatment or careful separation techniques after or during the synthesis or preparation of the various components; some minor amounts of scavenging compound can still normally be used in the polymerization process itself.

Typically the scavenging compound will be an organometallic compound such as the Group 13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminoxane, and n-octyl aluminum. Those scavenging compounds having bulky or $C_8$–$C_{20}$ linear hydrocarbyl substituents covalently bound to the metal or metalloid center being preferred to minimize adverse interaction with the active catalyst. When alumoxane or Ziegler cocatalyst is used as activator, any excess over the amount of late-transition-metal present will act as scavenger compounds and additional scavenging compounds may not be necessary. The amount of scavenging agent to be used with late transition metal cation-non-coordinating anion pairs is minimized during polymerization reactions to that amount effective to enhance activity.

The catalyst systems of this invention can additionally be prepared by combining in any order the bidentate ligand L, or a known precursor to it, with a suitable late transition metal complex, and an activator compound. For example, the bidentate ligand L precursor $(2,6\text{-i-}Pr_2C_6H_3N\!=\!CH)_2$ may be added to the late transition metal complex $NiBr_2$—$MeOCH_2CH_2OMe$ in a solvent such as toluene having the activator compound methylalumoxane dissolved therein. Optionally, oxidizing or reducing agents may be used additionally to achieve the preferred $d^6$, $d^8$ or $d^{10}$ metal compounds. All reactants may be added in any order, or even essentially simultaneously.

A preferred process of polymerization is that conducted at high pressure, that is at from 200 to 3000 bar, preferably from 500 to 2500 bar, more preferably from 800 to 2500 bar, in a homogeneous single phase or two fluid phases, with or without unreactive diluents or solvents at temperatures generally above the melting point of the polymer being produced, e.g. 120° C.–225° C., preferably 120°–170° C. Such processes are typically known and may include the use of scavenger compounds and catalyst deactivation or killing steps, see for example U.S. Pat. Nos. 5,432,242 and 5,408,017, and International publications WO 92/14766 and WO 95/07941. Each of these documents and their U.S. counterparts are incorporated by reference for purposes of U.S. patent practice. Preferred catalyst deactivators, or killers, include high molecular weight, non-recyclable compounds, such as polyvinyl alcohol which exhibit the functional capacity to complex with the catalysts so as to deactivate them while not forming volatile polar by-products or residual unreacted compounds. In the high pressure, supercritical ethylene process, no solvent is used, however, small amounts of solvent may be introduced into the reactor as the catalyst carrier or diluent. Such a process is defined herein as being substantially in the absence of solvent.

Another preferred process in which any of the catalyst, cocatalyst and scavenger selections disclosed in this application can be advantageously practiced is that of a continuous, solution process operated at or above 90° C. to 120° C., even to 150° C. or to 160° C. Typically this process is conducted in an inert hydrocarbon solvent, linear, cyclic or branched aliphatic, or aromatic, at a pressure of from 20 to 200 bar (2000 to 20016 kPa), the disclosures of U.S. patent applications Ser. No. 08/426,363, filed Apr. 21, 1995, U.S. Pat. No. 5,696,213 and Ser. No. 08/545,973 filed Oct. 20, 1995, abn provide relevant description. These documents also are incorporated by reference for purposes of U.S. patent practice.

The process in accordance with copending application, U.S. Ser. No. 08/244,948, filed Jan. 9, 1995, abandoned published as WO 93/11171, is also a preferred process. Its 2-phase suspension process is conducted at medium pressures of at least 50 bar and temperatures at least 10° C. greater than the melting point of the polymer being prepared, e.g. 80° C. to 250° C., preferably 90° C. to 170° C. These documents are incorporated by reference for purposes of U.S. patent practice.

The catalysts of the invention, as illustrated by Brookhart, et al, supra, exhibit significant losses in $M_n$ and $T_m$, and a related gain in the number of branches per 1000 carbon atoms when going from 0° C. to 25° C. It is thus important in the processes above to utilize either ethylene concentrations or pressures, to compensate for the adverse effects observed. Thus, with increased concentration in ethylene in the high temperature solution processes and in the high ethylene pressure processes illustrated above, the adverse effects are minimized and the benefits of the invention are optimized. Though losses in activity with increasing temperature are noted as well, the improvements represented by comparably increased $M_n$, comparably decreased branching (and consequent increase in $T_m$), and efficiency permit the preparation of industrially useful polymers that are not permitted under the conditions in the prior art. Accordingly, the solution process can have ethylene pressures of 60 psia (414 kPa) to 365 psia (2517 kPa), preferably 80 psia (552 psia) to 365 psia (2517 kPa), more preferably 100 psia (689 kPa) to 350 psia (2413 kPa), even more preferably 120 psia (827 kPa) to 350 psia (2413 kPa), and most preferably 150 psia (1034 kPa) to 350 psia (2413 kPa). Preferred temperature ranges are at or above 90° C. to 120° C., even to 150° C. or to 160° C.

It is particularly suitable that the processes also should be designed or conducted such that the cocatalyst components, that is the transition metal compounds and the activator or cocatalyst compounds, are maintained separately until just prior to or during polymerization use in the chosen reactor. An example is the use of dual injection of each catalyst component directly into the reactor or the use of T- or multi-joint mixing chambers just prior to injection into the reactor. Alternatively the catalyst may be formed in-situ by the independent addition of activator, late transition metal catalyst precursor compound, and scavenger directly into the reactor.

boxylic acids and the like. More preferably vinyl esters, halides and nitrites. See also the monomers of U.S. Pat. No. 4,987,200 which is incorporated by reference for the purpose of U.S. Patent Practice.

For the following examples, all molecular weights are weight average molecular weight unless otherwise noted. Molecular weights (weight average molecular weight ($M_w$) and number average molecular weight ($M_n$) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III" J. Cazes Ed., Marcel Decker, 1981, page 207, which is incorporated by reference for purposes of U.S. patent practice herein. No corrections for column spreading were employed, however, data on generally accepted standards, e.g. National Bureau of Standards Polyethylene 1475, demonstrated a precision with 0.1 units for $M_w/M_n$ which was calculated from elution times. The numerical analyses were performed using Expert Ease software available from Waters Corporation.

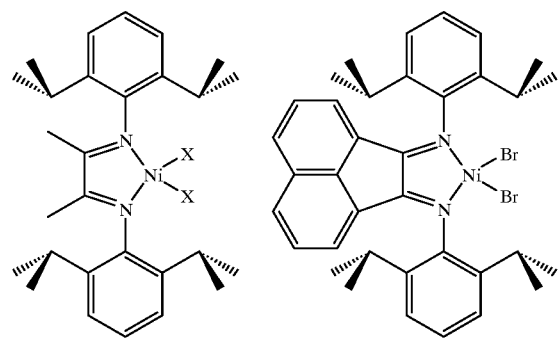

| Structure | | |
|---|---|---|
| Designation | TM-2, X = Br | TM-4 |

In the processes discussed above, with the invention catalysts described in this application, unsaturated monomers, that is olefinically or ethylenically unsaturated monomers, may be polymerized so as to form polymer products having molecular weights (weight-average or $M_w$) from about 500 to about 3×10⁶. Most typically, the polymer products will have an $M_w$ of from about 1000 to about 1.0×10⁶. Suitable unsaturated monomers will include ethylene, $C_3$–$C_{20}$ α-olefins, $C_4$–$C_{20}$ cyclic olefins, $C_4$–$C_{20}$ non-conjugated diolefins, $C_8$–$C_{20}$ aromatic substituted olefins or $C_{20}$–$C_{1000}$ α-olefin macromers. Preferably the polymer products will be any of polyethylene homopolymers, ethylene copolymers, particularly polyethylene plastomers and elastomers. And, in view of the known tolerance of the catalysts to polar monomers, ethylenically unsaturated polar monomers will additionally be polymerizable or copolymerizable. The preferred polar monomers include $C_4$–$C_{20}$ olefins containing functional groupings such as esters, carboxylates, nitriles, amines, amides, alcohols, halides car- Polymerization Method 1: High Pressure Polymerization The polymerizations of Table 1, below, were performed in a stirred 100 ml steel autoclave reaction vessel which was equipped to perform continuous Ziegler-Natta type polymerization reactions at pressures up to 2000 bar and temperatures up to 250° C. The reaction system was equipped to measure temperature and pressure continuously and supplied continuously with purified compressed ethylene. Equipment for continuously introducing a measured flow of catalyst and cocatalyst solution, and equipment for collecting the polymer product were also part of the reaction system. Without the addition of a solvent, the polymerzations were performed with ethylene pressurized at 1350 bar to 1750 bar. No hydrogen was used. The catalyst solution is prepared by mixing continuous feeds of a solution of a specified concentration of the transition metal compound [acenaphthene bis-N,N'-(2,6-diisopropylphenyl) imine] dibromo nickel(II) (TM-4) in toluene with a methylalumoxane solution in toluene at the molar ratio of transition metal to total aluminum of 1 to 2000. This solution is continuously fed into the pressurized and heated reaction vessel. When the reaction conditions were stabilized polymer samples were collected from the continuously running polymerization reaction.

Exact run conditions are collected in Table 1 including pressure (p) in bar, temperature (T) in °C., residence time (res. time) in seconds, catalyst concentration (cat. conc.) in mol-ppm as well as sampling time (sampl. time) in seconds, polymer yield (yield) in grams, ethylene conversion (conv.) in %, productivity (prod.) in kg polymer/mol catalyst and polymer characteristics including number of short chain branchings (SCB) per 1000 carbons determined by $^{13}C$ - NMR: total, methyl- (Me), ethyl- (Et), propyl- (Pr), 1,3-diethyl (Et$_2$), butyl- (Bu), amyl- , hexyl and larger branches (hex+); molecular weight data by GPC (diffuse refractive index): molecular weight ($M_w$, $M_z$) in dalton, molecular weight distribution (MWD).

An example of how to use the information contained in Table 1 follows describing example No. 1 using the reactor design as described above with a ratio of transition metal to aluminum of 1 to 2000. The transition metal compound and the methylalumoxane solution are fed into the stirred 100 ml autoclave pressurized to 1350 bar and heated to 120° C. maintaining a catalyst concentration of 1.1597 mol-ppm with a catalyst residence time of 230 seconds. When temperature and pressure were stabilized a polymer sample was collected over a period of 791 s to yield 2.45 g of polymer product representing an ethylene conversion of 1.8% and a productivity of 415 kg polymer/mol transition metal catalyst.

$^{13}C$ - NMR analysis of the product gave a total number of SCB of 34.08 consisting of 23.2 methyl branches, 0.36 ethyl branches, 2.18 propyl branches, 3.08 1,3-diethyl branches, 0.91 butyl branches, 0.91 amyl branches and 3.44 hexyl or larger branches. GPC analysis (DRI) gave the following molecular weight data: Mw=150 900 dalton, Mw/Mn=2.073 and Mz=305 200 dalton.

Polymerization Method 2: Semi Batch Solution/Suspension Polymerizations in Hexane Conditions of the polymerization examples are given in Table 3. Polymerizations were performed in a hot nitrogen purged 500 cc Zipperclave reactor (Autoclave Engineers) in dry hexane (about 250 to 300 cc) or toluene (400 cc) as the polymerization solvent/diluent. The catalyst solution was prepared in the dry box by mixing about 5 to 50 mg of late transition metal catalyst precursor TM-2 or TM-4 in 50 to 120 mg of toluene or 1,2-difluorobenzene for about 30 minutes. The cocatalyst used was methylalumoxane (MAO) in a 10 wt % toluene solution. Usually, 2.5 cc of the solutions was diluted to 10 cc with fresh toluene. The polymerizations were run by combining in-situ (in the reactor) the catalyst precursor and the cocatalyst solutions which had been previously added. The catalyst precursor solution was pumped to the reactor, and combined with the previously added cocatalyst solution, until the ethylene make-up flow became constant during the polymerization. The reactor temperature was controlled by steam/cooling water mixture flowing through the reactor jacket. The hexane or toluene was saturated with ethylene at the designated pressure and temperature prior to pumping the catalyst. By virtue of the limited solubility of the forming polymer in hexane, the polymer mass forms a solid phase suspended in hexane, thus making this process a slurry process. The catalyst in both instances is provided in solution, but is unsupported.

The polymerizations were run for about 30 minutes. At the end, the ethylene was vented and the reactor was cooled down. The reactor content was poured to a 1 L beaker and treated with isopropyl alcohol or acetone. The polymer solvent mixture was blown down with nitrogen or filtered to recover the polymer. The final product was dried under vacuum at 60 to 90° C. for about 12 hours. The samples were analyzed by $^1$H-NMR for branching and by GPC for molecular weight. Product characteristics are reported in Table 4.

Polymerization Method 3: Semi Batch Solution/Suspension Polymerizations in Toluene.

Conditions of the polymerization examples are given in Table 3. Polymerizations were performed as in Method 2 with the following exceptions. A 1 L Zipperclave reactor (Autoclave Engineers) was used with toluene as polymerization solvent/diluent. The desired amount of late transition metal catalyst precursor was pumped into the reactor as a 1,2-difluorobenzene solution. The reactor contents were treated with acetone prior to recovery of the polymer. The polymer product was dried under vacuum at 50° C. for about 12 hours. Product characterization are reported in Table 4.

TABLE 1

| No. | p (bar) | T (C.) | res. time (s) | cat. conc. (mol-ppm) | sampl. time (s) | yield (g) | conv. % | prod. (kg/mol) |
|---|---|---|---|---|---|---|---|---|
| 1 | 1350 | 120 | 230 | 1.15968 | 791 | 2.45 | 1.8 | 415 |
| 2 | 1350 | 120 | 230 | 1.15968 | 1439 | 2.7 | 1.1 | 251 |
| 3 | 1750 | 120 | 185 | 0.81771 | 610 | 0.5 | 0.4 | 137 |
| 4 | 1750 | 120 | 186 | 0.82107 | 870 | 2.6 | 0.6 | 501 |
| 5 | 1350 | 165 | 185 | 0.79998 | 1001 | 1.3 | 0.8 | 232 |
| 6 | 1350 | 165 | 185 | 0.93331 | 858 | 0.6 | 0.4 | 107 |
| 7 | 1750 | 165 | 168 | 0.83953 | 904 | 1.7 | 1.1 | 296 |
| 8 | 1750 | 165 | 168 | 1.04961 | 422 | 1 | 1.4 | 298 |

TABLE 2

| | total SCB/ 1000 C. | Me | Et[1] | Pr | 1,3-Et$_2$[1] | Bu | Amyl | Hex+ | Mw | Mw/Mn | Mz |
|---|---|---|---|---|---|---|---|---|---|---|---|
| 1 | 34.08 | 23.2 | 0.36 | 2.18 | 3.08 | 0.91 | 0.91 | 3.44 | 150900 | 2.07 | 305200 |
| 2 | 38.52 | 26.93 | 0.38 | 1.86 | 4.04 | 1.37 | 1.07 | 2.87 | 134200 | 2.64 | 252000 |
| 3 | 20.16 | 10.41 | 0.78 | nm | 1.56 | 0.91 | 2.6 | 3.9 | 175400 | 2.34 | 296700 |
| 4 | 17.09 | 11.99 | 0 | 0.36 | 1.6 | 1.24 | 0.7 | 1.2 | 167500 | 2.92 | 281900 |
| 5 | 41.13 | 25.09 | 0.37 | 2 | 4.94 | 2.32 | 1.65 | 4.76 | 92600 | 2.48 | 173300 |
| 6 | 46.9 | 29.48 | 0 | 2.22 | 5.92 | 3.08 | 1.87 | 4.33 | 91200 | 2.38 | 172200 |
| 7 | 28.79 | 19 | 0.41 | 1.24 | 3.38 | 1.73 | 0.56 | 2.47 | 98700 | 2.83 | 177800 |
| 8 | 30.19 | 20.3 | 0.16 | 1.12 | 3.09 | 1.46 | 1.06 | 3 | 108600 | 2.14 | 175700 |

[1]Total Et branches are determined by addition of the columns labelled Et and 1,3-Et$_2$

TABLE 3

| Ex | Cat. | Method | $C_2^-$ psi | $C_2^-$ kPa | °C. | min | TM1 μmol | activ. μmol | activ. TM1[1] | Yield g | g PE g cat.[2] |
|---|---|---|---|---|---|---|---|---|---|---|---|
| C-1 | TM-4 | 4 | 14.7 | 101 | 0 | 30 | 0.83 | 1532 | 1837 | 2.2 | 3667 |
| C-2 | TM-4 | 4 | 58.8 | 405 | 0 | 30 | 0.83 | 1532 | 1837 | 2.1 | 3500 |
| C-3 | TM-4 | 4 | 14.7 | 101 | 25 | 30 | 0.83 | 1532 | 1837 | 1.8 | 3000 |
| 9 | TM-2 | 3 | 40 | 276 | 60 | 30 | 1.00 | 1532 | 1532 | 3 | 4839 |
| 10 | TM-2 | 3 | 80 | 552 | 60 | 30 | 1.00 | 1532 | 1532 | 6.6 | 10645 |
| 11 | TM-2 | 3 | 120 | 827 | 60 | 30 | 1.00 | 1532 | 1532 | 9.4 | 15161 |
| 12 | TM-2 | 3 | 200 | 1379 | 60 | 30 | 1.00 | 1532 | 1532 | 11.5 | 18548 |
| 13 | TM-2 | 3 | 280 | 1931 | 60 | 30 | 1.00 | 1532 | 1532 | 12.5 | 20161 |
| 14 | TM-4 | 2 | 50 | 345 | 60 | 30 | 0.904 | 268.85 | 297 | 4.1 | 6270 |
| 15 | TM-4 | 2 | 118 | 814 | 60 | 30 | 0.834 | 268.85 | 322 | 6.2 | 10350 |
| 16 | TM-4 | 2 | 118 | 814 | 60 | 30 | 0.765 | 268.85 | 351 | 5.8 | 10600 |
| 17 | TM-4 | 2 | 118 | 814 | 60 | 30 | 0.528 | 268.85 | 509 | 4.9 | 13000 |
| 18 | TM-4 | 2 | 150 | 1034 | 60 | 30 | 0.375 | 268.85 | 717 | 2.9 | 11110 |
| 19 | TM-4 | 2 | 240 | 1655 | 60 | 30 | 0.584 | 268.85 | 460 | 8.6 | 20480 |
| 20 | TM-4 | 2 | 350 | 2413 | 60 | 30 | 0.320 | 268.85 | 840 | 6 | 26170 |

C-X = Polymerization Comparative X;
TM = transition metal;
PE = polyethylene;
$C_2^-$ = ethylene;
activ. = activator.
[1] Unless noted the activator is MAO and activ./TM is the ratio of Al to TM based on the Al analysis of the MAO.
[2] Grams polyethylene per gram transition metal complex catalyst precusor.

Polymerization Method 4: Semi Batch Polymerization in Toulene.

This is the method of the comparative examples (C1–C3) disclosed in Brookhart, et al, supra

TABLE 4

Batch Polymerization Process Examples

| Ex | Cat. | Method | MW ×10⁻³ | MWD | Me/1000 C[1] |
|---|---|---|---|---|---|
| C-1 | TM-4 | 4 | 1600 | 2.4 | 24.0 |
| C-2 | TM-4 | 4 | 1400 | 2.3 | 5.0 |
| C-3 | TM-4 | 4 | 410 | 2.2 | 71.0 |
| 9 | TM-2 | 3 | 397 | 3.3 | 92.7 |
| 10 | TM-2 | 3 | 353 | 2.3 | 79.7 |
| 11 | TM-2 | 3 | 543 | 2.5 | 71.4 |
| 12 | TM-2 | 3 | 553 | 2.6 | 59.6 |
| 13 | TM-2 | 3 | 557 | 2.7 | 55.1 |
| 14 | TM-4 | 2 | 168 | 1.9 | 65.2 |
| 15 | TM-4 | 2 | 267 | 2.1 | 65.2 |
| 16 | TM-4 | 2 | 262 | 1.9 | 69.8 |
| 17 | TM-4 | 2 | 235 | 2.0 | 73.2 |
| 18 | TM-4 | 2 | 278 | 2.0 | 59.7 |
| 19 | TM-4 | 2 | 338 | 2.0 | 48.0 |
| 20 | TM-4 | 2 | 332 | 2.0 | 35.9 |

C-X = Polymerization Comparative X;
TM = transition metal;
[1] Me groups per 1000 carbons

TABLE 5

Predicted vs. Observed Branching

| Ex | Cat | °C. | psia | kPa | Me/1000 C[1] | |
|---|---|---|---|---|---|---|
| C-1 | TM-4 | 0 | 14.7 | 101 | 24 | |
| C-2 | TM-4 | 0 | 58.8 | 405 | 5 | −.431 branch/psi vs. Ex. C-1 |
| C-3 | TM-4 | 25 | 14.7 | 101 | 71 | +1.88 branch/° C. vs. Ex. C-1 |
| calc | TM-4 | 120 | 572 | 3944 | 0 | Extrapolated from Ex. C-1 |

TABLE 5-continued

Predicted vs. Observed Branching

| Ex | Cat | °C. | psia | kPa | Me/1000 C[1] |
|---|---|---|---|---|---|
| 1 | TM-4 | 120 | 19575 | 134975 | 34 |
| 4 | TM-4 | 120 | 25375 | 174968 | 17 |

[1] Me groups per 1000 carbons.

From examination of Table 5, and examples C-1 and C-2 reported by Brookhart, et. al., supra, we observe that branching of the polymer C-1 decreased from 24 branches/1000 carbon atoms at 14.7 psia ethylene to 5 branches/1000 carbon atoms in C-2 at 58.8 psia ethylene. From this, one skilled in the art is led to believe that branching would decrease by 0.431 branches per one psia increase in pressure. Similarly, comparing examples C-1 and C-3 one skilled in the art is led to believe that branching would increase by 1.88 per °C. of temperature increase.

From these observations, it would appear that extrapolating the data from Ex. C-1 to 120° C. would result in an increase in branching to 250 branches per 1000 carbon atoms. Therefore, a concomitant increase in pressure to 594 psia (4095 KPa) would offset the temperature effects on branching and reduce the branches/1000 C to 0. As a consequence, one would expect that at 120° C., all pressures above 594 psia (4095 KPa) would result in 0 branches/1000 C. Surprisingly, however, at 120° C. and pressures as high as 19,575 psia (134,975 kPa) and 25,375 psia (174,968 kPa) significant branches/1000 C were still observed (34 branches/1000 C and 17 branches/1000 C, respectively) in the polymerization of Method 1 (Table 2).

The polymerization data of Brookhart, as shown in Tables 3 and 4, teaches that as pressure is increased, molecular weight decreases. Therefore, one skilled in the art would expect that under any set of otherwise comparative conditions, an increase in pressure would lead to a decrease in molecular weight of the polymer. However, examples 1–8 (of Tables 1 and 2) show that for catalyst TM-4 at both 120° C. and 165° C., an increase in pressure from 19,575 psia (134,975 kPa) to 25,375 psia (174,968 kPa) leads to an increase in molecular weight of the polymer. Furthermore, as shown in Tables 3 and 4, data for both TM-2 and TM-4 at 60° C. and ethylene pressures from 40 psia (276 kPa) to 350 psia (2413 kPa) demonstrate the same trend of increasing molecular weight as ethylene pressure is increased, in contrast to the trend established by the polymerization data of Brookhart.

We claim:

1. A process for the polymerization of olefins comprising contacting ethylene and optionally, one or more ethylenically unsaturated monomers, with an unsupported late transition metal catalyst system comprising an activated Group 8, 9, 10 or 11 transition metal compound stabilized by a bidentate ligand, the late transition metal compound of the formula:

LMX$_r$ wherein M is a Group 8, 9, 10 or 11 metal; L is a bidentate ligand defined by the formula:

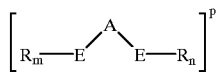

wherein A is a bridging group containing a Group 13–15 element; each E is independently a Group 15 or 16 element bonded to M; each R is independently a C$_1$–C$_{30}$ containing radical or diradical group which is a hydrocarbyl, substituted hydrocarbyl, halocarbyl, substituted halocarbyl, hydrocarbyl-substituted organometalloid, halocarbyl-substituted organometalloid, m and n are independently 1 or 2 depending on the valency of E; and p is the charge on the bidentate ligand such that the oxidation state of MX$_r$ is satisfied;

each X is, independently, a hydride radical, a hydrocarbyl radical, a substituted hydrocarbyl radical, a halocarbyl radical, a substituted halocarbyl radical, hydrocarbyl-substituted organometalloid or halocarbyl-substituted organometalloid; or two X's are joined and bound to the metal atom to form a metallacycle ring containing from about 2 to about 20 carbon atoms; a neutral hydrocarbyl containing donor ligand; a halogen, an alkoxide, an aryloxide, an amide, a phosphide, or other univalent anionic ligand; or two X's are joined to form an anionic chelating ligand; or a neutral non-hydrocarbyl atom containing donor ligand; and r is 0, 1, 2 or 3;

at an ethylene pressure of at least 200 bar (2.03×10$^4$ kPa) and a reaction temperature equal to or greater than 120° C.

2. The process of claim 1 wherein said contacting is in a solvent or diluent.

3. The process of claim 2 wherein said contacting is done in a continuous, single phase process.

4. The process of claim 3 wherein the reaction temperature is 120–160° C. and the ethylene pressure is from 500 to 2500 bar (5.06×10$^4$ to 2.53×10$^5$ kPa).

5. The process of claim 1 wherein said late transition metal compound is activated by an alumoxane or Ziegler cocatalyst.

6. The process of claim 5 wherein the transition metal compound to activator ratio is from 1:1000 to 1:1.

7. The process of claim 1 wherein the late transition metal compound is activated by a noncoordinating anion precursor compound.

8. The process of claim 7 wherein the noncoordinating anion precursor compound contains the noncoordinating anion tetrakis(perfluorophenyl)boron.

9. The process of claim 7 wherein the noncoordinating anion precursor compound is a halide salt of Group 13–16 metals or metalloids.

10. The process of claim 7 wherein the metal complex is prepared by combining a transition metal compound with an ionizing anion precursor where the molar ratio of the transition metal compound to the ionizing anion precursor is from about 10:1 to 1:10.

11. The process of claim 7 wherein the transition metal system additionally comprises a scavenging compound.

12. The process of claim 1 wherein the bidentate ligand stabilizes a square planar geometry.

* * * * *